United States Patent [19]

Chapin et al.

[11] Patent Number: 4,955,688

[45] Date of Patent: Sep. 11, 1990

[54] OPTICAL FIBER PACKAGE AND METHODS OF MAKING

[75] Inventors: John T. Chapin, Alpharetta; Charles W. Jackson, Dunwoody; Thomas O. Mensah, Doraville; Mickey R. Reynolds, Lawrenceville, all of Ga.

[73] Assignee: AT&T Bell Laboratories, Murray Hill, N.J.

[21] Appl. No.: 328,930

[22] Filed: Mar. 27, 1989

[51] Int. Cl.$^5$ ............................................. G02B 6/02
[52] U.S. Cl. .............................. 350/96.29; 350/96.23
[58] Field of Search ............... 350/96.10, 96.20, 96.21, 350/96.22, 96.23, 96.29

[56] References Cited

U.S. PATENT DOCUMENTS

| | | | |
|---|---|---|---|
| 2,200,720 | 5/1940 | Morin, et al. | 112/251 |
| 2,639,097 | 5/1953 | Scott, Jr. | 242/10 |
| 2,732,817 | 1/1956 | Robinson | 112/251 |
| 3,044,614 | 7/1962 | Hanscom | 206/59 |
| 3,114,456 | 12/1963 | Van Billiard | 206/59 |
| 3,156,185 | 11/1964 | Hermann, et al. | 102/1 |
| 3,217,989 | 11/1965 | Vogel | 242/18 |
| 3,319,781 | 5/1967 | Simpson, et al. | 206/59 |
| 3,783,180 | 1/1974 | Splicer | 174/110 R |
| 4,326,657 | 4/1982 | Arpin, et al. | 226/97 |
| 4,553,815 | 11/1985 | Martin | 350/96.23 |
| 4,565,593 | 1/1986 | Marr | 350/96.21 |
| 4,701,015 | 10/1987 | Saito et al. | 350/96.23 |
| 4,752,113 | 6/1988 | Saito et al. | 350/96.23 |
| 4,781,434 | 11/1988 | Kitagawa et al. | 350/96.23 |
| 4,793,048 | 12/1988 | Kashiwaya et al. | 350/96.23 |
| 4,798,346 | 1/1989 | Myers et al. | 242/18 A |

*Primary Examiner*—William L. Sikes
*Assistant Examiner*—Akm E. Ullah
*Attorney, Agent, or Firm*—Edward W. Somers

[57] ABSTRACT

An optical fiber package (20) is provided by winding a plurality of convolutions in a plurality of layers on a bobbin. To each layer is applied an adhesive material (45) which in a preferred embodiment is a mixture comprising a reactive silicone copolymer resin, a solvent system which includes an aromatic constituent, a catalyst and a wetting agent. The mixture has a modulus behavior which is relatively stable with respect to time throughout a relatively wide operating temperature. Inasmuch as the solvent system and the method of application of the mixture are effective to control the rate of precipitation and the rate of cure of the silicone constituent, the surface roughness of the convolutions is controlled. After the desired number of convolutions have been wound, the package is subjected to a heat treatment which relieves stresses in the wound fiber and which completes the cure of the adhesive material. The adhesive material is effective to hold the convolutions together sufficiently to allow transport and deployment and to allow the convolutions constantly to be payed off over a relatively wide temperature range and over a relatively wide range of payout speeds without the use of excessive force and without breakage.

13 Claims, 6 Drawing Sheets

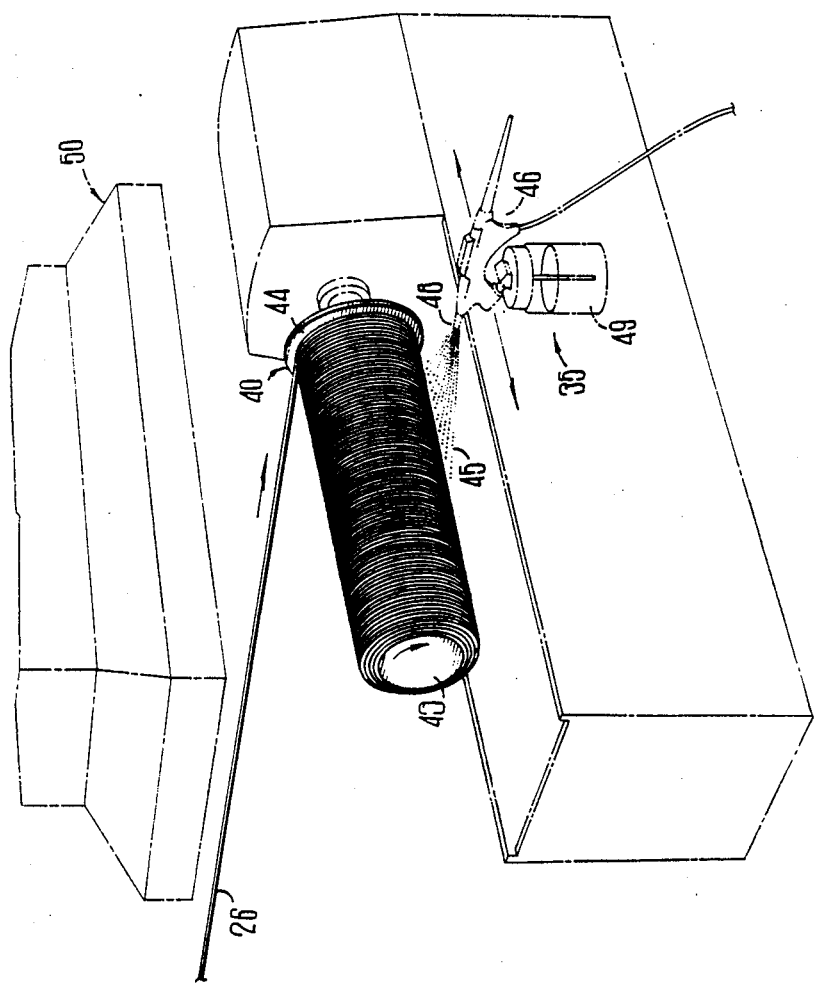

OPTICAL FIBER PACKAGE AND METHODS OF MAKING

TECHNICAL FIELD

This invention relates to an optical fiber package and to methods of making same. More particularly, this invention relates to a mass of convolutions of optical fiber which are wound on a bobbin and adhered together and to methods of making same.

BACKGROUND OF THE INVENTION

After only a somewhat recent introduction, optical fiber has had a meteoric rise as the predominant means of transmission media in voice and data communications. Optical fiber is manufactured by drawing the fiber from a preform which is made by any of several well known processes. Afterwards, or as part of a tandem process, the drawn fiber is coated, measured and taken up, desirably in an automatic takeup apparatus, on a spool to provide a package. Typically, an optical fiber has a diameter on the order of 125 microns, for example, and is covered with a coating material which increases the outer diameter of the coated fiber to about 250 microns, for example. Methods and apparatus for taking up optical fiber are disclosed and claimed in U.S. Pat. No. 4,798,346 which issued on Jan. 17, 1989 in the names of D. L. Myers and J. W. Wright.

An optical fiber package is used in operations such as ribboning, cabling, and rewinding and is used to ship optical fiber to other companies which further process the fiber. The optical fiber typically is used in voice and data communications systems, both commercial and military. For example, the package may be used in weapons systems in which it is used for guidance and for data communications. Such uses include communication lines between aircraft, between an aircraft and a ship, and between a projectile, such as a missile, and a control station at a launch site, for example. Optical fiber provides the advantages of increased data bandwidth, reduced weight and greater range than wire-guided systems of the prior art.

There are, however, certain disadvantages, not present in other forms of communication, in using optical fiber. Optical fiber is less robust than metallic conductors, rendering it subject to breakage. Aside from breakage, optical fiber communication performance may be degraded by microbends in the fiber which are generated by bending or by other stresses to which the fiber may be subjected. Such damage to an optical fiber not only reduces the long-term durability of the fiber, but also causes losses in the strength and in the content of the optical signal. Likewise, physical or optical integrity may be affected adversely by any sharp bends which are experienced as the fiber pays out from its packaged configuration.

A typical optical fiber application in a weapons systems involves the packaging of a continuous length of optical fiber on a bobbin which is positioned inside a vehicle. Such a vehicle commonly is referred to as a tethered vehicle. One end of the fiber is attached to operational devices in the vehicle, whereas the other end of the fiber is connected to a control or communications station at a launch site. During and after launch, two-way communication with the vehicle is conducted.

In order to use such an arrangement, there must be provided a reliable and compact package of the optical fiber which may be disposed within the vehicle and which will permit reliable deployment of the optical fiber during the flight of the vehicle. The use of metallic conductors for guidance or control of launched vehicles is known. Although the art teaches the use of bobbins on which a metallic conductor is wound, the fragility of optical fiber requires specialized treatment that facilitates the unwinding of the optical fiber from its bobbin at a relatively high rate of speed.

One problem is that extremely long lengths of fiber may be required. These may be obtained by splicing a plurality of lengths. Typically, the original coating material is removed from an end portion of each of the two coated fibers to be splice. The removal is such that the end of the coating material remaining on the end portion is a surface which is normal to the axis of the fiber. The recoating material contacts the adjacent originally coated portions of the spliced fibers along those normal surfaces and along overlapping portions of the outer surface of the original coating material adjacent to the normal surfaces. The coating material is then cured to yield a recoated splice section with a transverse cross section which is larger than that of the optical fiber having the original coating material thereon.

For tethered vehicles, the winding of the optical fiber on the payoff device must be accomplished in a precise manner. Otherwise, payoff could be disrupted. It has been found that if the cross section of the recoated portion transverse of the longitudinal axis of the optical fiber is not the same as that of the optical fiber as originally coated, the winding pattern on the payoff device in all likelihood is not uniform. This will cause problems in fiber payoff following the launch of the tethered vehicle.

Another problem in the optical fiber guidance of tethered vehicles relates to the successful unwinding of the fiber from a bobbin as the bobbin is propelled along with the vehicle. In optical fiber packages for use in tethered vehicles, as many as at least thirty layers of optical fiber are wound on a guiding structure. The leading end of the optical fiber is connected to a guidance system for controlling the path of travel of the vehicle. It becomes important for the optical fiber to be payed off from the bobbin without the occurrence of snags, or tight bends, otherwise the fiber may break or the signal may be attenuated and the control system rendered inoperable. Contributing to the successful payout of the optical fiber is a precision wound package. Not only must the convolutions be wound with precision, they also must remain in place as wound during handling and during depoyment. In other words, the optical fiber package must be a highly stable one.

An adhesive material between the optical fiber turns on the bobbin must function to hold the package together, forming a stable structure which is resistant to environmental extremes, shock and vibration. On the other hand, payout must occur easily without the necessity of high pulling forces to remove each convolution of fiber from the package. Desirably, the adhesive material which is used to hold together the convolutions must have a minimal impact on the optical performance of the wound fiber, and yet it must allow the optical fiber to be payed out with a controlled force at the peel-off point as each successive outermost turn is unwound at high speed. These requirements of stability and ease of payout present somewhat conflicting requirements for the adhesive system.

During storage and transport of the bobbin, mechanical stability is most important as the adhesive adds integrity to the wound package, thereby maintaining the package in a ready condition for deployment. During deployment, both mechanical and optical effects are significant. The adhesive system must provide tack which is sufficiently low to permit a helical pattern of payout at potentially high speeds, possibly approaching or exceeding Mach 1. Excessive tack threatens fiber integrity by forming an extreme bend at the peel-off point. On the other hand, not enough tack may result in failure through dynamic instability on the bobbin. With respect to optical performance, optical attenuation at the peel-off point may occur through localized macrobending, degrading the integrity of data and video transmission. Also, microbending in the layers of undeployed fiber on the bobbin during deployment can affect adversely optical performance.

It has been found that the adhesive material can contribute significantly to attenuation increases, especially at lower temperatures. Total permissible losses must be maintained within system limits set by the transmission opto-electronics over a specified operational temperature range, for example from −25° to 60° C. Typical initial optical fiber losses may comprise a portion of the attenuation budget, emphasizing the need to keep additional attenuation-inducing effects low for increased range.

The primary mechanism for adhesive-induced attenuation is believed to be the quality of the surface of the adhesive material which has been applied to the fiber layers. A rough surface, for example, causes microbends on the optical fiber in engagement with the rough surface because of the pressures developed during winding. These microbends are intensified as the adhesive material and the optical fiber coating stiffen with decreasing temperature.

Current techniques for providing such a stable package include the coating of each layer of fiber convolutions after they have been wound on the bobbin. In the prior art, at least one system includes a spraying apparatus. The apparatus is used to apply a liquid adhesive material to the optical fiber convolutions as they are wound on a bobbin. In the development of optical fiber use for tethered vehicles, a polychloroprene rubber cement adhesive material has been used. Problems have been encountered with that material insofar as aging characteristics and attenuation performance over a wide temperature are concerned.

What is needed and what has not been available in the prior art are methods for providing a bobbin of precision wound optical fiber in which the convolutions of fiber are held together by an adhesive material. The adhesive material should be such that it stabilizes the package yet permits payout at relatively high speeds. Further, the process should be easily repeatable from one bobbin to another. And, importantly, the surface portion of each convolution which is coated with the adhesive material must not be too rough, thereby avoiding microbending of the optical fiber.

SUMMARY OF THE INVENTION

The foregoing problems have been overcome with an optical fiber package of this invention. The optical fiber package includes a plurality of convolutions which may be wound in a plurality of layers on a bobbin such that adjacent convolutions are in engagement with one another. Applied to the convolutions in each layer is an adhesive material comprising a mixture which includes a silicone resin copolymer material. The silicone material has a modulus behavior which is relatively stable with respect to time over a relatively wide temperature range at payout speeds which may be at least as high as about 300 meters per second. As a result, the optical fiber reliably may be payed out within a short period of time or much later and at substantially varying temperature.

In a preferred embodiment, the adhesive material also includes a non-hygroscopic solvent system. The solvent system which comprises an aromatic solvent is effective to control the rate of precipitation and has a rate of evaporation which helps to control the cure of the silicone resin. The mixture of the preferred embodiment also includes a catalyst and a wetting agent. As a result of suitable tuning of the solvent system, the catalyst and the wetting agent, a polymeric residue precipitate which is formed during evaporation is such as to provide a smooth surface which avoids the imposition of microbends on the optical fiber.

In a method of providing the optical fiber package, a plurality of layers each comprising a plurality of optical fibers are precision wound on a bobbin in a humidity controlled atmosphere. Applied to each layer is an adhesive material which is a mixture comprising a moisture reactive silicone resin oligomer adhesive material and a solvent system. In the preferred embodiment, the mixture comprises a silicone resin and toluene. After the adhesive material has been applied to a layer, winding of the next successive layer is delayed to allow evaporation of solvent and partial cure. Desirably, the adhesion between contiguous optical fiber portions in the same layer exceeds that between optical fiber portions in adjacent layers. Of course, there must still be sufficient adhesion between layers to promote stability. After the mixture has been applied, and all the desired layers of convolutions wound, the wound bobbin is caused to be disposed in a heat conditioning facility wherein the wound optical fiber package is exposed to a predetermined temperature and humidity. The treatment relieves stresses which have been imparted to the optical fiber during the winding step and also substantially completes the cure of the adhesive material. The controlled humidity facilitates the diffusion of moisture through the silicone.

BRIEF DESCRIPTION OF THE DRAWING

Other features of the present invention will be more readily understood from the following detailed description of specific embodiments thereof when read in conjunction with the accompanying drawings, in which:

FIG. 4 is a perspective view of a portion of the apparatus of FIG. 3 for applying an adhesive material to the wound optical fiber;

DETAILED DESCRIPTION

Figure 2:
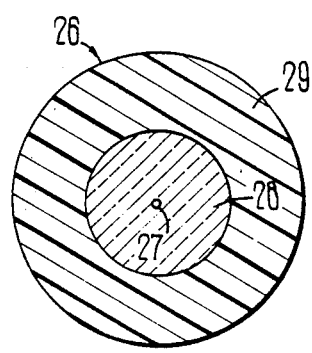
FIG. 2 is an enlarged end cross sectional view of an optical fiber.
Figure 1:
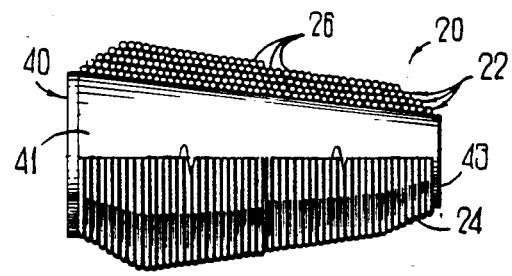
FIG. 1 is a schematic view of a wound optical fiber package comprising a plurality of layers of convolutions of optical fiber which are wound on a bobbin.

Referring now to FIG. 1, there is shown an optical fiber package which is designated generally by the numeral 20. The package 20 of a preferred embodiment includes a plurality of layers 22 each comprising a plurality of convolutions 24—24 of an elongated optical transmitting medium. Such a medium may be an optical fiber 26 which comprises a core 27 (see FIG. 2), a cladding 28 and a coating 29 or multiple coatings. Typically, the outer diameter of the coated optical fiber is 250 $\mu$m. The term elongated optical transmitting medium is intended to designate optical fiber with single or multiple protective coatings and possibly buffer layering thereon, as well as a so-called micro optical cable which includes a single optical fiber with protective sheathing thereabout.

Figure 3:
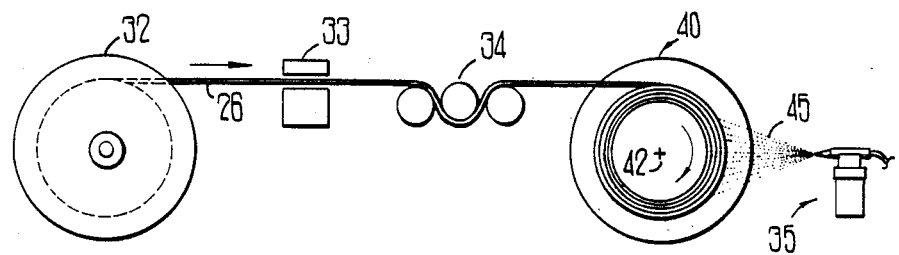
FIG. 3 is a schematic view of apparatus for winding optical fiber on a bobbin and for applying adhesive material to optical fiber.

As is seen in FIG. 3, which depicts a preferred embodiment of the method of this invention, the optical fiber 26 is payed out from a supply spool 32 and advanced past a diameter measuring gauge 33, a tension measurement device 34 and past a spray apparatus 35 (see also FIG. 4). The optical fiber is precision wound on a bobbin 40.

Continuous film forming techniques from low viscosity solutions, using the spray technique is attractive for non-stationary objects with surfaces that are difficult to reach or poorly defined such as convolutions being wound on a bobbin. The target here is the slowly rotating bobbin 40 on a surface of which is precision wound a plurality of layers of optical fibers. The bobbin 40, which may be made of aluminum, for example, includes a hub 41 (see FIG. 4) which is tapered slightly. In a preferred embodiment, the bobbin 40 during winding of the optical fiber thereon is caused to be turned rotatably about a longitudinal axis 42 (see FIG. 3) at a first rotational speed.

The methods of this invention involve the application of an adhesive material 45 on the optical fiber which is wound on the bobbin 40 from an end 43 to a flanged end 44. Desirably, outwardly facing interstices are partially filled without voids or bubbles and form generally a meniscus between adjacent convolutions. During the application of the adhesive material, the bobbin is turned, in a preferred embodiment at a second rotational speed which is less than the first rotational speed. An airbrush 46 (see FIG. 4) is used to apply the adhesive material. A carrier gas such as dry nitrogen from a high pressure cylinder is forced through a circular nozzle 48 which includes a venturi orifice to draw solvent-diluted adhesive material from an attached bottle 49. The venturi opening and thus the quantity of the adhesive material delivered may be adjusted.

The ratio of aerodynamic forces to surface tension forces, which is dimensionless and which is referred to as the Weber number, controls the droplet size of the spray or mist formed. The critical Weber number is the value at which stable droplets are formed from the nozzle. For low viscosity fluids, the critical Weber number is between 10 and 20. Break-up of the droplets can occur either upon impingement on the target or from high turbulence which is generated as the spray droplets decelerate through the surrounding atmosphere. The spray angle which depends on the orifice geometry generally determines the width of the bobbin surface which is covered and may be changed as required for desired orifice-to-target surface separation.

A guidance structure is provided in the bobbin 40 to facilitate the winding of optical fiber to provide a package 20 of wound fiber. For example, an initial base layer of convolutions of metallic wire of an outside diameter which is slightly greater than that of the optical fiber is wound on the bobbin. This layer provides grooves into which are disposed the convolutions of the innermost layer of the optical fiber convolutions. Slippage is avoided and precision winding of the initial layer of optical fiber is accomplished. Convolutions of the optical fiber then are wound under a controlled tension over this base layer followed by another application of the adhesive mixture. Each successive fiber layer is wound on the last wound optical fiber layer after about a ten minute interval with step back procedures adopted near ends of the bobbin to prevent unraveling of wound layers. This procedure is continued until the desired number of layers of optical fiber are wound on the bobbin. The winding is performed at room temperature. In order to provide a suitable viscosity of the adhesive material so that it may be sprayed, the adhesive material includes a solvent system.

Various parameters of the application process influence the composition of the adhesive mixture. These parameters contribute to the peel force required to pull the optical fiber free from the bobbin 40. For example, the distance from the tip of the nozzle 48 to the target convolutions is important in that variations therein change the concentration as well as the amount of the adhesive mixture which is applied to the convolutions and hence affects the peel force. That distance which is a controlled distance is in one embodiment about 4 inches and is held constant notwithstanding a build-up of the convolutions. This build up varies of course the spray distance but only by about 0.5 inch.

Also, if the spray distance is too great, the adhesive mixture may experience too much evaporation as the spray traverses the distance and hence the adhesive material lands with insufficient dilution to wet the convolutions. On the other hand, if the spray distance is too low, the adhesive material will flow on the convolutions or be applied in too thick a layer.

It is important to keep in mind the concerns that are sought to be addressed. First, there is the physical concern of how does the optical fiber behave as it is peeled off the bobbin at high speed. On the payout side, the pull force must be acceptable. Of concern is the ease with which the adhesive material fractures. Also, of concern is how the peel force changes with respect to increased speed as more of the optical fiber is payed out. The payout must be acceptable over a range of temperatures and over a range of time. In short, what is desired is substantially constant payout behavior over a relatively long period of time at any of a wide range of operating temperatures.

Another physical concern is the stability of the package. The package may be stored for a number of years and be subjected to vibration. It is desired that the package remain organized during this period. The adhesive should inhibit reorganization of the package in what are known as "slumps", where fibers in one layer move between fibers in adjacent layers.

Secondly, optical performance of the wound optical fiber must be optimized. Forces are generated because the optical fiber is under tension. Pressure between the optical fibers occurs. Should the surface of the convolutions be rough, microbending occurs. In order to maintain low loss, a smooth, uniform surface is needed to minimize peturbations in the lateral force against the coated optical fiber and thereby minimize attenuation.

In the preferred embodiment, each layer of convolutions is wound before applying an adhesive material. Then the rotation of the bobbin is reduced and the airbrush 46 is controlled to be moved along the hub of the bobbin 40 in a number of passes. The linear travel of the airbrush 46 along the bobbin is determined by the length of the bobbin. If the spray distance is relatively large, the spray is applied in a wider band and hence the speed of traverse can be slower to achieve a uniform coat. In a preferred embodiment, forty passes are used. By a pass is meant movement in either direction.

Figure 5:
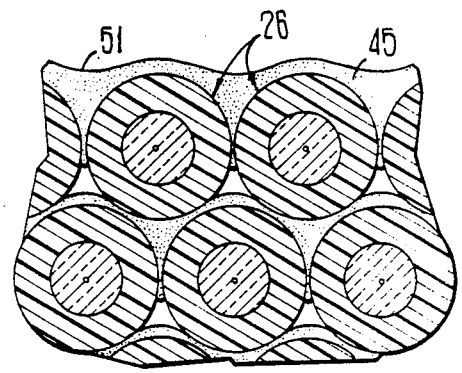
FIG. 5 is a schematic view of a portion of the wound package showing portions of the convolutions to which adhesive material has been applied.

A most critical parameter is the amount of the adhesive material 45 which is applied. Of course, it is applied to achieve a uniform coverage. As can be seen in FIG. 5, the adhesive material is applied to cover an outer portion of the periphery of each convolution. Further, the adhesive material 45 fills partially valleys between adjacent convolutions to form adhesive joints therebetween. As is seen in FIG. 5, the adhesive material 45 in each valley forms a meniscus 51.

The adhesion between adjacent turns in the same layer relative to that between adjacent fiber portions in different layers is important. The adhesion between adjacent convolutions in the same layer desirably exceeds that between fiber portions in successive layers. Of course, the adhesion between fiber portions in successive layers must be sufficient to maintain a stable package. As a result of these relative adhesion values, there is not undue adhesion between optical fiber in successive layers. This helps to avoid multiple payout of convolutions from the bobbins. In order to accomplish this, there is a delay after each layer of convolutions is sprayed prior to winding the next successive layer. This allows time for solvent evaporation and hence avoids undue adhesion between layers.

After the sprayed mixture hits the target, it should spread evenly by a process called leveling, while a volatile component or components evaporates to assist the cure of the final adhesive layer. As can be seen in FIG. 4, the bobbin 40 is sprayed under a hood 50 which exhausts solvent vapors given off during the process. Physical properties of the adhesive material such as surface tension and viscosity determine the spray droplet size, as well as the spreading ability of the solvent.

The adhesive material 45 which is sprayed onto the convolutions is a mixture which comprises a moisture reactive silicone resin oligomer and a solvent system which includes a non-hygroscopic solvent. In the presence of moisture, the material cures. In the process of curing, the silicone resin releases, advantageously, no organic materials which adversely affects the optical fiber coating material. In the preferred embodiment, the spray mixture comprises from about 5 to about 50% by weight of a silicone resin solution with 20% being preferred. The silicone resin solution comprises about 80% by weight of a silicone resin block copolymer and about 20% by weight of toluene. A preferred silicone resin solution is one available commercially from the Dow Corning Company under the designation DC 1-2577.

Added to the silicone resin is a solvent system comprising about 50 to about 95% by weight of the mixture. Solvent evaporates and moisture is absorbed into the copolymer resin which begins the process of curing.

The preferred solvent which is added to the silicone resin solution is a non-hygroscopic, aromatic solvent. Although toluene is preferred, xylene, for example, which is chemically similar to toluene, may be used. Aromatic solvents are characterized by their stability; once dried by distillation, they remain dry and will not reabsorb water. On the other hand, a solvent such as methyl ethyl ketone (MEK) is not regarded as stable to water inasmuch as it absorbs water by hydrogen bonding. MEK does, however posses some desirable properties such as its boiling point and vapor pressure. Accordingly, aromatic solvents which have boiling points and vapor pressures similar to those properties of MEK are used. Further, a solvent system which includes a mixture of an aromatic solvent and MEK may be used. In such a mixture, the aromatic solvent, for example, comprises about 60% by weight of MEK and 40% by weight of toluene.

It will be recalled that at least some of the solvent evaporates between the airbrush 46 and the optical fiber. The evaporation must be controlled to avoid depositing a partially cured material on the optical fiber. A partially cured material would result in a rough surface and lower than desired adhesion between convolutions. A partially cured material which arrives at the fiber surface also increases low temperature roughness and increases loss.

Also in the preferred embodiment, the mixture comprises a catalyst and a wetting agent. Added are about 0.05% by weight of a catalyst such as dibutyltin oxide or dibutlytin dilaurate or dibutlytin diacetate and about 0.1% by weight of a wetting agent such as DC 344 fluid which is available from the Dow Corning Company. The catalyst which is effective at temperatures above ambient functions during the heat conditioning cycle to facilitate the curing process and assures completion of that process. The cure rate can be changed by using a higher temperature and by using a catalyst. A normal cure time for an uncatalyzed mixture is in terms of hours. In the preferred embodiment of this invention, the mixture cures in about one hour. The temperature and the catalyst cooperate to assure that the reaction goes to completion and that it will not be in an intermediate cure with a possible change in properties during storage.

The wetting agent of the preferred embodiment causes the sprayed mixture to wet the surface in a desired manner. It causes the adhesive material to have improved flow and to fill the interstices between adjacent convolutions (see FIGS. 5). The wetting agent is included in a relatively small concentration.

Silicone is the preferred adhesive constituent because of its excellent stability and low temperature properties. Silicone has stable environmental performance including oxidative and hydrolytic stability. Because the silicone which is used is a block copolymer, its mechanical properties when temperature cycled remain within a desired range.

The modulus and the viscoelastic behavior of the adhesive mixture over a relatively wide operating temperature range is important. The adhesive material contributes to the performance from both the optical and the physical points of view.

The modulus of the adhesive material is important for both physical and optical reasons. From a physical standpoint, the adhesive material must have a sufficiently high modulus such that the package is stable from the outset and after a significant storage time. Also, the adhesive material is such that the packaged optical fiber exhibits suitable optical performance which is not compromised by the modulus of the adhesive material.

Figure 6:
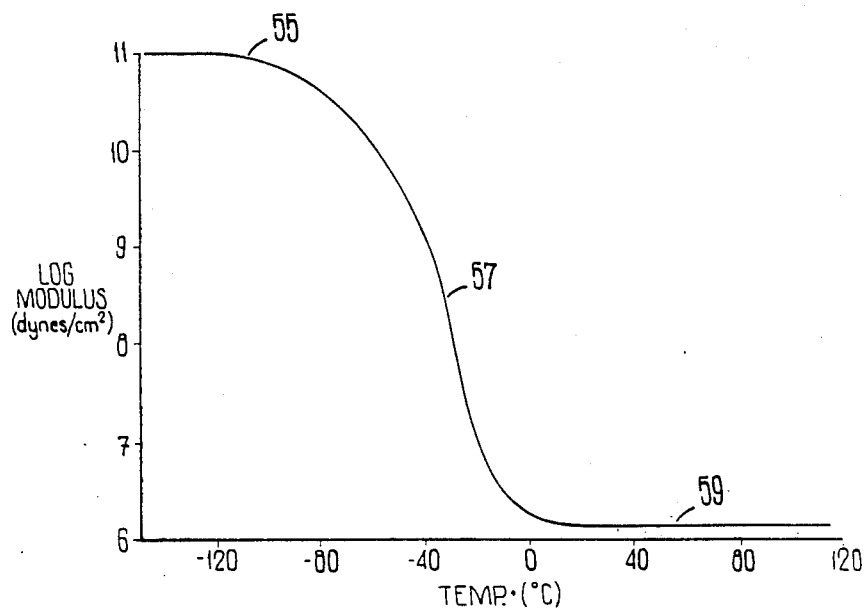
FIG. 6 is a curve which depicts a plot of the logarithm of modulus versus temperatures for a typical polymeric material.

The modulus of a polymeric material is time and temperature dependent. FIG. 6 illustrates schematically the general behavior of the modulus of a polymeric material as a function of temperature. A polymer is said to be in the glassy state if it is in the region 55 of the curve, in which the modulus is high (on order of about $10^{11}$ dynes/cm$^2$) and substantially constant. The knee in the curve defines a parameter referred to as glass transition temperature, $T_g$. The glass transition temperature, $T_g$, of a material is the temperature, determined for instance, by means of stress/strain measurement, at which the modulus of the material changes from a relatively high value occurring in the lower temperature, glassy state of the material to the lower value occurring in the transition region to the higher temperature, elastomeric state of the material. In FIG. 6, the $T_g$ separates in a transition region 57 the glassy region 55 from a region 59 in which the modulus is low (e.g. on order of about $10^6$ dynes/cm$^2$) and substantially constant and which is the elastomeric region of the polymer.

Normally, and as should be evident from FIG. 6, many polymeric materials are not stable with respect to time and temperature. And yet for the package of this invention, stability throughout a time and temperature range is what is needed. At high temperatures or after relatively long storage times, the modulus can not be so low that package stability becomes a concern. At low temperatures, the modulus should not be so high as to impair payout at relatively high payout times. By payout time is meant the time which is required to allow a portion of the wound optical fiber to break the adhesive bond with contiguous portions of the wound fiber.

Between −32° C. and 60° C., which is the expected launch temperature range, the adhesive material must insure stable payout behavior and maintain the optical performance of the bobbin with wound fiber. If the adhesive constituent had a $T_g$ which fell within the launch window, the material could be too stiff or too weak in part of the operational temperature range. What is desired is that the silicone constituent of the spray mixture of this invention has a modulus behavior within the launch window which is relatively stable with respect to time at payout speeds which may be at least as high as about 300 meters per second. If this requirement is met, payout performance is substantially constant whether it occurs shortly after winding or years later and whether or not it is performed at either end of the temperature launch window.

What was needed was a silicone adhesive material with a modulus lower than that of the coating of the optical fiber but substantially constant over the operational temperature range. An adhesive modulus significantly less than the coating modulus helps assure minimum microbending attenuation on the wound bobbin; however, the modulus cannot become too low at elevated temperatures or the wound bobbin may become mechanically unstable. Therefore, between −32° C. and 60° C., the expected deployment temperature range, the adhesive must stabilize the wound bobbin while minimally contributing to increased microbending attenuation.

Not all silicone materials are acceptable. The silicone constituent of the adhesive material of the package of this invention includes a low molecular weight oligomer, more specifically, it comprises a methoxy terminated polysiloxane oligomer. Reaction of moisture with the silicone oligomer causes curing during winding and during the subsequent heat conditioning. The oligomer contains block segments which have different glass transition temperatures, $T_g$.

Figure 7:
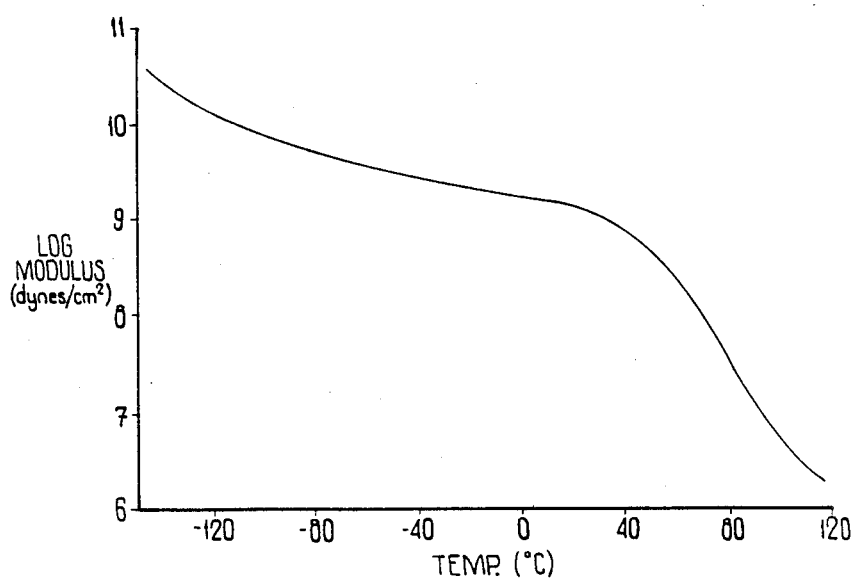
FIG. 7 is a curve which depicts at nominal strain rates a plot of the logarithm of modulus of the adhesive material of the optical fiber package of this invention versus temperature.

As can be seen from FIG. 7, the spray mixture of this invention has a modulus variation within the launch window which is about $10^8$ to $10^{9.5}$ dynes/cm$^2$. If the modulus is too low, stabilization properties are not acceptable; if too high there is excessive loss or fiber breakage could occur during payout.

To achieve this stability, the silicone of this invention is a block copolymer, as noted, having dual $T_g$ characteristics providing the substantially constant modulus over the operational temperature range. By dual $T_g$ characteristics is meant that the polymeric adhesive material of this invention has a transition from a relatively high modulus to a plateau which spans between the relatively high modulus and a relatively low modulus. There is a defined $T_g$ between the relatively high modulus and the plateau and another $T_g$ between that plateau and the relatively low modulus of the elastomeric region.

The dual $T_g$ is important. Within the plateau between the dual $T_g$ values, the modulus is sufficiently high to provide package stability. This intermediate plateau or region is sufficiently long with respect to temperature and time so that the physical problems associated with payout are overcome. Advantageously, because of its dual $T_g$ characteristics, the adhesive material of the package of this invention can perform well at either end of the environmental temperature spectrum.

If the adhesive material is too stiff such as is shown in FIG. 6, then at normal temperatures, it will not protect the optical fiber. However, the materials of this invention exhibit a modulus curve similar to that shown in FIG. 7 which is different in a significant aspect from that of FIG. 6. As is seen, the modulus of the block copolymer of the adhesive material of this invention is relatively stable over an operating temperature range of from about −100° C., to about 60° C., at a nominal time of about 15 seconds, remaining at a substantially constant value over a wide range of temperature. In other words, the transition between a rigid glassy state and an elastomeric state is less steep and is spread over a wider temperature range. This is advantageous in that it is of help in preserving the optical performance of the optical fiber.

Figure 9:
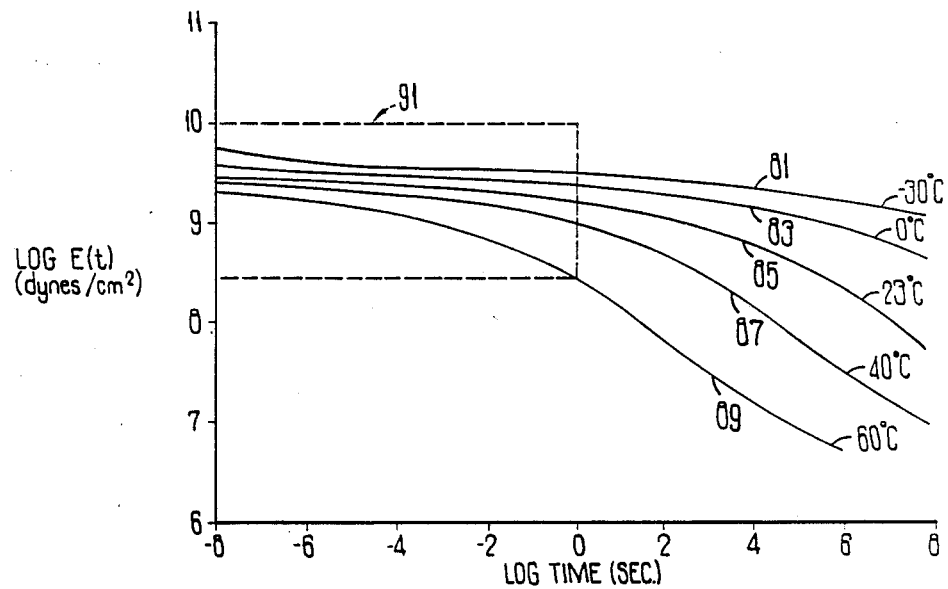
FIGS. 8 and 9 are graphs which show the relaxation modulus behavior of the adhesive material of a prior art package and of the package of this invention as depicted in plots at each of several temperatures with the logarithm of modulus versus the logarithm of time.
Figure 8:
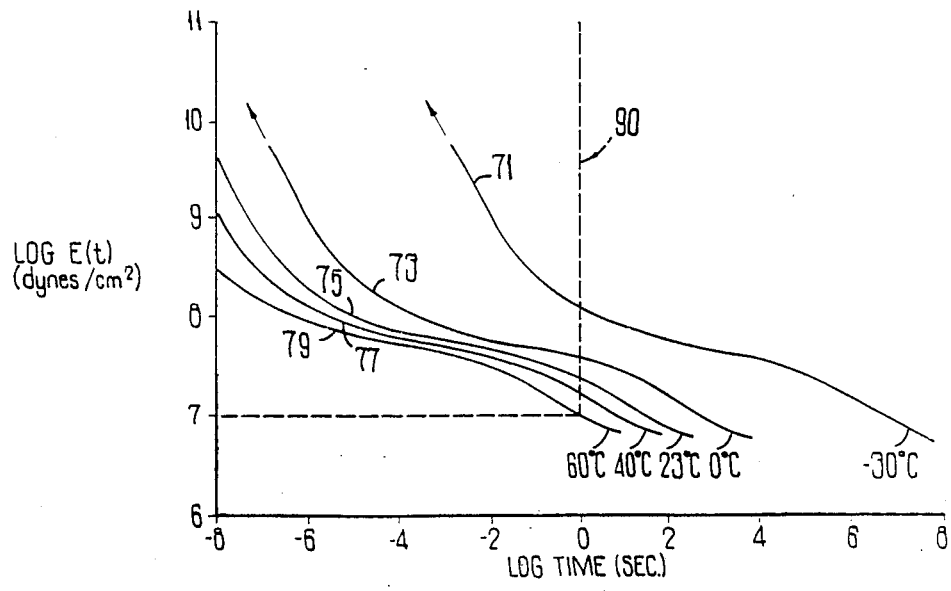

Also of importance are the graphs of FIGS. 8 and 9 which depict, at various temperatures, the logarithm of modulus as a function of the logarithm of time. FIGS. 8 and 9 depict the relaxation behavior of the modulus of a prior art adhesive material and of the adhesive material of the package of this invention, respectively. FIG. 8 depicts curves 71, 73, 75, 77 and 79 of an adhesive system used in a prior art package whereas FIG. 9 shows comparable curves 81, 83, 85, 87 and 89 for the adhesive material of the package of this invention. As is seen, curves 71, 73, 75, 77 and 79 for that prior art system reflect substantially less stability over time.

Superimposed on the graph of the curves in each figure are windows 90 and 91 which are, respectively, operating windows of time for a prior art package and for a package of this invention. Outlined on each graph in a direction parallel to the X axis is a span of time representative of payout times, the time being the time during which a portion of the optical fiber experiences peel off from an underlying layer. That window extends from a relatively short payout time of $10^{-8}$ sec. to one second. As can be seen, the modulus variation of the adhesive material of the prior art package in that window of time is from about $10^{7.0}$ to some value greater than $10^{10}$ for the temperature range shown. On the other hand, the modulus behavior of the adhesive material of the package of this invention is relatively stable throughout at least the payout window of time. As can be seen from FIG. 9, the modulus variation throughout the temperature range represented by the five curves and extending from $-30°$ C. to $60°$ C. is about $10^{8.4}$ to about $10^{9.8}$ dynes/cm$^2$.

The precision wound package of this invention may remain in storage for some time as represented by the higher log time values outside the so-called payout window. At these times, the material has relaxed and the modulus is somewhat lower. However, at payout, the modulus which is exhibited at the peel point again are those values shown in the payout window. This demonstrates that the modulus behavior at the peel point is relatively stable with respect to time.

The extrapolations of FIG. 8 and FIG. 9 to lengthy time periods such as may occur on storage assume no chemical alteration such as may be obtained in a nonoxidative environment. In actuality, it has been found that the prior art package of cured fiber, which includes the adhesive material, the modulus relaxation behavior of which is depicted in FIG. 8, becomes chemically altered by the aging process. As a result, it becomes embrittled and its modulus behavior is substantially different from that depicted in FIG. 8. On the other hand, the adhesive material of the invention is not chemically altered by the aging process and its modulus behavior is stable with respect to time.

Figure 10:
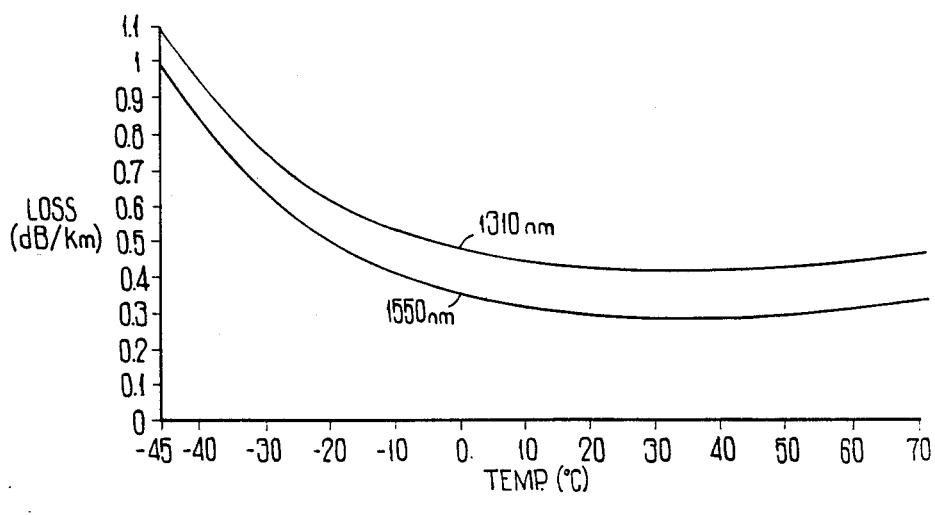
FIG. 10 is a graph which depicts a plot of loss in wound optical fiber of a package of this invention versus temperature.

After winding, the packaged optical fiber is heat-conditioned at a temperature of about 71° C. in a chamber (not shown) to relax stresses generated during winding. Most of the solvent evaporation occurs prior to the heat-conditioning, however, some heat-assisted cure does occur in the chamber. The elevated temperature also warms the adhesive and any polymeric coating materials on the optical fiber to the elastomeric region so that stress relaxation more readily occurs, improving optical performance. After the heat-conditioning, a thermal cycle exposes the bobbin to the operational temperatures $-32°$ C. to $60°$ C. and the storage extremes of $-46°$ C. to $71°$ C. Optical attenuation for samples was measured throughout the thermal cycle and physical integrity was evaluated. The greatest attenuation always occurred at temperatures below ambient (room temperature) conditions (see FIG. 10); little attenuation increase occurred at an elevated temperature. FIG. 10 shows the thermal performance of the optical fiber wound on a bobbin at each of two operating wavelengths. Values under about 1 dB/Km at $-30°$ C. are acceptable.

Although the silicone adhesive material is more stiff than some prior art materials used in the winding of packages for tethered vehicles, it comprises a low molecular weight oligomer which subsequently forms a film by evaporation and by curing. Treatment within the heat conditioning chamber completes the cure. The time afforded by the evaporation and the curing allows the adhesive material to distribute into a uniform film. The solvent system is effective to control the evaporation and hence the subsequent cure of the adhesive material. As a result, the adhesive material can remain at a longer time in a low viscosity state so that it is able to smooth out before it cures. The curing process also relies on the diffusion of water into the adhesive material and the subsequent reaction. Accordingly, the cure also depends on the ambient humidity of the winding area.

Figure 11:
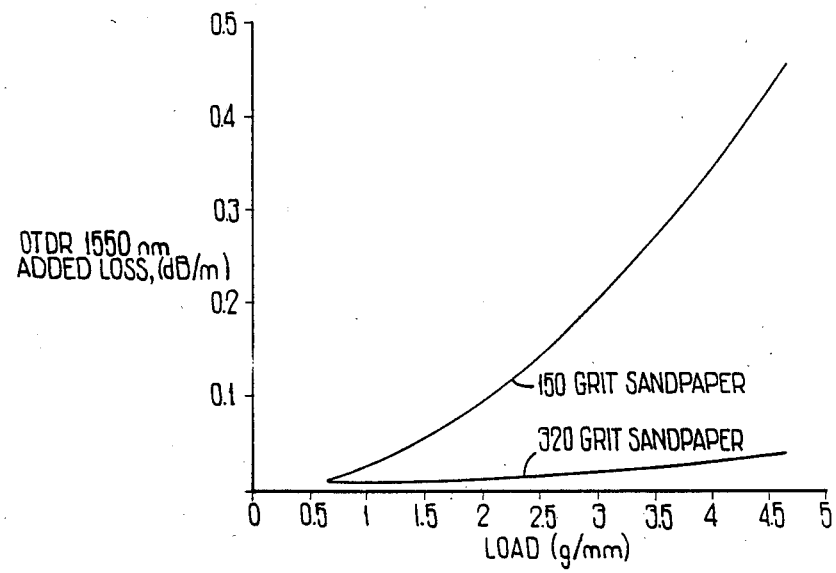
FIG. 11 illustrates the effect of lateral loading and surface irregularity on attenuation of optical fiber.

It is well known from microbending theory that optical fiber, when subjected to distributed lateral forces, will exhibit an increase in attenuation. See Marcuse, D., "Microdeformation Losses of Single Mode Fiber," Applied Optics, Vol. 23, No. 7, pp. 1082-1091, Apr. 1, 1984. For example, a Telecommunications Industries Association Fiber Optic Test Procedure (FOTP-68) specifies a means to evaluate the sensitivity of optical fiber designs to distributed lateral loading. The test measures the attenuation of optical fiber as a function of load intensity, the load imparted by precision plattens faced with a specified grit sandpaper. Similarly, the attenuation is a function of the size of the irregularity. FIG. 11 shows that as either load or irregularity size increases, attenuation increases.

To correlate surface texture to fiber loss performance, each sample wound bobbin provided in accordance with this invention was measured for optical loss. All optical measurements were performed by means of an optical time domain reflectometer, (OTDR). Lower losses were observed with packages of this invention which have reduced surface roughness.

It has been possible to arrive at a material system comprising an adhesive material and a solvent system which is suitable for controlling the rate of evaporation of the solvent system, precipitation and the reaction rate of the polymeric adhesive system. Through the aid of microscopic examination, the surface characteristics of the adhesive film on the optical fibers on a wound bobbin were correlated with low temperature optical loss.

This approach allowed differing solvent systems and varied spray process parameters to be correlated with attenuation at low temperature. The adhesive system was designed and applied in a manner that reduces surface roughness between fiber portions wound for tethered vehicle applications. Optical fiber packages including such adhesive system met the loss budget requirement at both operational and storage temperatures.

Figure 12:
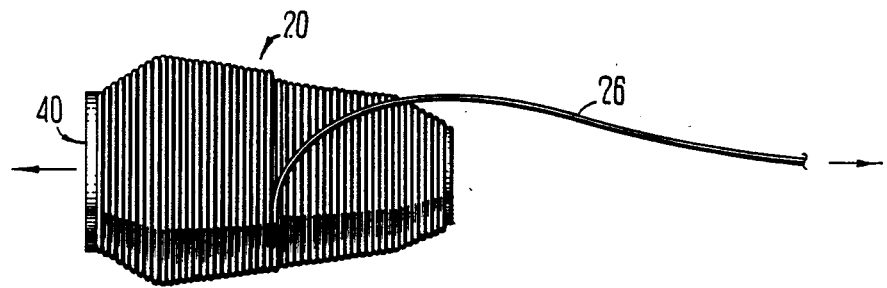
FIG. 12 is a schematic view of payout of a precision wound bobbin of optical fiber.
Figure 13:
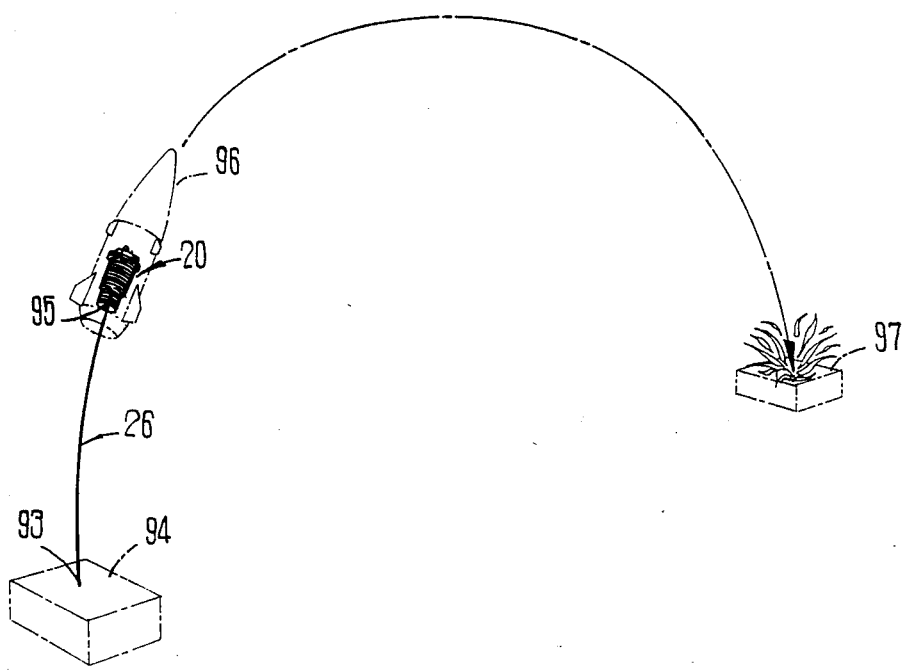
FIG. 13 is a schematic view of the precision wound bobbin of this invention as used in a tethered vehicle.

As can be seen in FIG. 12, the stable package 20 comprising the bobbin 40 of precision wound optical fiber may be positioned so that the optical fiber is payed off in an axial direction as the bobbin is being propelled in the opposite direction. In one application of the package of this invention, one end 93 of the optical fiber may be connected to a control system 94 (see FIG. 13) and another end 95 to electronic gear within a tethered vehicle 96. The control system 94 is effective to guide the vehicle 96 to a target 97. Of course, it should be understood that the optical fiber may be wound on a mandrel and the mandrel removed from the package after the winding has been accomplished. With such a package, the optical fiber may be unwound from the inside toward the outside instead of in the manner shown when the fiber is wound on a bobbin.

The optical fiber package of this invention overcomes the problems of the prior art. Advantageously, the adhesive material 45 stabilizes the package to allow storage and transport and readiness for deployment. Further, the adhesive material 45 allows mishap-free deployment and minimally affects optical fiber performance.

It is to be understood that the above-described arrangements are simply illustrative of the invention. Other arrangements may be devised by those skilled in the art which will embody the principles of the invention and fall within the spirit and scope thereof.

We claim:

1. A package of elongated optical transmitting medium from which the elongated optical transmitting medium may be payed out, said package comprising:
   a plurality of convolutions of an elongated optical transmitting medium which are disposed with adjacent convolutions being in engagement with one another; and
   an adhesive material which has been applied to said convolutions and which comprises a mixture which includes a silicone adhesive constituent having a modulus behavior which is relatively stable with respect to time over a relatively wide range of temperature at payout speeds which may be at least as much as about 300 meters per second.

2. An optical fiber package from which optical fiber may be payed out, said package comprising:
   a plurality of convolutions of optical fiber which are disposed with adjacent convolutions being in engagement with one another; and
   an adhesive material applied to said convolutions which comprises a mixture which includes a reactive silicone adhesive resin constituent having a modulus variation throughout an operating temperature range which is relatively stable with respect to time at payout speeds which may be at least as much as about 300 meters per second, and a solvent system which includes an aromatic solvent constituent, said solvent system being effective to control precipitation of the adhesive constituent and thereby control the surface roughness of the convolutions.

3. An optical fiber package from which optical fiber may be payed out, said package comprising:
   a bobbin;
   a plurality of convolutions of optical fiber which are wound on said bobbin with adjacent convolutions being in engagement with one another; and
   an adhesive material which has been applied to said convolutions and which includes a mixture comprising a silicone adhesive constituent which has a modulus variation which is relatively stable with respect to time throughout a relatively wide operating temperature range at payout speeds which may be as high as about 300 meters per second and a solvent system, said solvent system being effective to control precipitation of the adhesive constituent and thereby control the surface roughness of the convolutions.

4. The package of claim 3, wherein said adhesive material covers portions of said convolutions which are contiguous to portions of adjacent convolutions.

5. The package of claim 4, wherein the adhesion between adjacent convolutions within the same layer is greater than that between contiguous optical fiber portions of different layers.

6. The package of claim 3, wherein the surfaces of the adhesive material which covers the optical fiber convolutions are substantially uniform.

7. The optical fiber package of claim 3, wherein said adhesive material comprises a reaction product of a reaction mixture which has been applied to the convolutions of each layer of said package, and wherein said mixture also comprises a catalyst and a wetting agent.

8. The optical fiber package of claim 3, wherein said solvent system is effective to prevent premature precipitation or premature curing of said adhesive material.

9. The optical fiber package of claim 8, wherein said solvent system comprises an aromatic solvent.

10. The optical fiber package of claim 9, wherein said solvent system comprises an aromatic solvent which has a boiling point and a vapor pressure similar to that of methyl ethyl ketone.

11. The optical fiber package of claim 10, wherein said solvent system is selected from the group consisting of toluene and xylene.

12. The optical fiber package of claim 3, wherein package is such that the optical fiber may be payed off an end of the bobbin without rotational motion of the bobbin about a longitudinal axis thereof.

13. The optical fiber package of claim 11, wherein the modulus of adhesive silicone material varies between about $10^{8.4}$ and $10^{9.8}$ dynes/cm$^2$ within a temperature range about $-30°$ C. to $60°$ C. over a time which extends from about 1 second to about $10^{-8}$ second.

* * * * *